United States Patent
Gilliam et al.

(10) Patent No.: US 7,730,005 B2
(45) Date of Patent: Jun. 1, 2010

(54) ISSUE TRACKING SYSTEM USING A CRITERIA RATING MATRIX AND WORKFLOW NOTIFICATION

(75) Inventors: Cathy Lynn Gilliam, Pittsboro, NC (US); Jo Ann M. Herndon, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 103 days.

(21) Appl. No.: 11/966,346

(22) Filed: Dec. 28, 2007

(65) Prior Publication Data

US 2009/0171881 A1 Jul. 2, 2009

(51) Int. Cl.
 G06F 17/00 (2006.01)
 G06F 9/44 (2006.01)
(52) U.S. Cl. .............. 706/45; 717/101; 717/102; 717/124; 706/46
(58) Field of Classification Search ............ 706/50; 707/203; 717/101, 124
 See application file for complete search history.

(56) References Cited

U.S. PATENT DOCUMENTS

| | | | |
|---|---|---|---|
| 5,950,209 A * | 9/1999 | Carrier et al. | 707/203 |
| 6,230,066 B1 | 5/2001 | Sferro et al. | |
| 6,397,202 B1 | 5/2002 | Higgins et al. | |
| 6,477,517 B1 | 11/2002 | Limaiem et al. | |
| 6,799,145 B2 * | 9/2004 | Kennedy et al. | 702/182 |
| 2002/0120481 A1 | 8/2002 | Woods et al. | |
| 2004/0236658 A1 * | 11/2004 | Bowman | 705/36 |
| 2004/0249832 A1 | 12/2004 | Goldthorpe | |
| 2005/0005258 A1 * | 1/2005 | Bhogal et al. | 717/102 |
| 2005/0038812 A1 | 2/2005 | Tirpak et al. | |
| 2005/0043919 A1 * | 2/2005 | Kennedy et al. | 702/182 |
| 2005/0071818 A1 * | 3/2005 | Reissman et al. | 717/127 |
| 2005/0125272 A1 * | 6/2005 | Hostetler | 705/7 |
| 2005/0288992 A1 | 12/2005 | Ackaret et al. | |
| 2006/0005157 A1 | 1/2006 | Saxena et al. | |
| 2006/0069701 A1 | 3/2006 | O'Rourke, III | |
| 2007/0122999 A1 | 5/2007 | Wilmot et al. | |
| 2007/0143165 A1 * | 6/2007 | Roberts et al. | 705/8 |
| 2008/0034351 A1 * | 2/2008 | Pugh et al. | 717/128 |
| 2008/0091774 A1 * | 4/2008 | Taylor et al. | 709/203 |
| 2008/0255693 A1 * | 10/2008 | Chaar et al. | 700/97 |
| 2009/0043621 A1 * | 2/2009 | Kershaw | 705/7 |
| 2009/0132611 A1 * | 5/2009 | Brown et al. | 707/203 |

OTHER PUBLICATIONS

Barnson et al. The Bugzilla Guide—2.16.11 Release. Mozilla.org Feb. 2006.*
Serrano et al. Bugzilla, ITracker, and other bug trackers. Software, IEEE. vol. 22, Issue: 2. On pp. 11-13. May 2005.*

* cited by examiner

*Primary Examiner*—David R Vincent
*Assistant Examiner*—David H Kim
(74) *Attorney, Agent, or Firm*—Yee & Associates, P.C.; Steven L. Bennett

(57) ABSTRACT

A computer implemented method, apparatus, and computer program product for managing a lesson learned through a client application. A lesson learned is information describing a task associated with a project. A rating value for the lesson learned is identified using a predefined level matrix. A workflow notification process is generated to address the lesson learned using a notification manager. The lesson learned is monitored throughout the duration of a project.

18 Claims, 13 Drawing Sheets

FIG. 4

RECORD 400

| IDENTIFIER | LESSON | RELEASE | SUBMITTER | STATUS | RATING VALUE | FIELD POSITIVE | ACTION ITEM |
|---|---|---|---|---|---|---|---|
| 402 | 404 | 406 | 408 | 410 | 412 | 414 | 416 |

FIG. 7

LEVEL MATRIX 700

| LESSON LEARNED LEVEL RATING SYSTEM | | POSITIVE IMPACT IF IMPLEMENTED — 704 | | |
|---|---|---|---|---|
| | | H | M | L — 712 |
| COMPLEXITY TO IMPLEMENT — 706 | L — 702 | 1 | 3 | 7 |
| | M — 708 | 2 | 4 | 8 — 714 |
| | H — 710 | 5 | 6 | 9 |

FIG. 8

RANKING COMPONENT 800

| | | ANSWER A (808) | ANSWER B (810) | ANSWER C (812) |
|---|---|---|---|---|
| 802 | QUESTION 1 | 3 | 6 | 4 |
| | | ANSWER A (814) | ANSWER B (816) | ANSWER C (818) / 820 |
| 804 | QUESTION 2 | 2 | 1 | 5 |
| | | ANSWER A | ANSWER B | ANSWER C |
| | | | 822 | |
| 806 | QUESTION 3 | 7 | 9 | 8 |

FIG. 5

LESSONS LEARNED INPUT MODULE
500

ISC SOLUTION DELIVERY

Lessons Learned Tool - Lessons Learned Screen

Lesson Learned
Lesson Learned Number: LA0001
Created by: Creator Name / ID and Date Created — CREATOR 502

| Lesson Learned ID: | LA0001 | IDENTIFIER 504 |
| * Release: | Non-Release 2006 | RELEASE 508 |
| * Lesson Learned: | This is a test for authorization purposes ... editing — LESSON LEARNED 506 |
| Comment: | |
| * Area: | PDTL |
| Submitter: | Creator Name / ID or Other Submitted Name / ID — SUBMITTER 510 |
| Status: | Closed — STATUS 512 |
| * Ratings: | [?]  Complexity to Implement [H O M L O]   Impact if Implemented [H O M L O]   Level [4] — LEVEL CRITERIA 514 |
| Positive | ○ Yes  ● No — FIELD POSITIVE 516 |

| Action Items | Target Date | Owner Name / ID | Owner | Mgt. Owner Name / ID | Mgt. Owner | Status |
|---|---|---|---|---|---|---|
| A | This is a test ... edit ... this is ready to be closed. Actions Complete | | | | | Closed |

ACTION ITEM 518

US 7,730,005 B2

ISSUE TRACKING SYSTEM USING A CRITERIA RATING MATRIX AND WORKFLOW NOTIFICATION

BACKGROUND OF THE INVENTION

1. Field of the Invention

The present invention relates generally to a data processing system and in particular to a method and apparatus for managing projects. More particularly, the present invention is directed to a computer implemented method, apparatus, and computer usable program code for managing and implementing lessons learned associated with a project in a closed loop process.

2. Description of the Related Art

The business environment is becoming increasingly competitive. From a consumer standpoint, this situation results in a quality product at a reasonable price. From a business standpoint, however, a business must continually optimize its processes in order to increase product quality and decrease operating costs.

A business typically incorporates standard processes for each product development stage, such as design, manufacturing, and testing. Each product development stage may include successes and failures in addition to expected results. The lessons learned during product development are often documented at the end of a release. A lesson learned is information regarding a project activity or task gained from experience. Lessons learned may include both positive action items to be repeated in the future, as well as negative action items indicating a need for improvement. Documenting lessons learned in a completed project is useful for application in future projects.

Lessons learned during product development are typically documented at the end of a release. Depending on the number of lessons learned, the complexity of each lesson learned, and any actions that may have been taken to address a lesson learned during product development, recalling all of the lessons learned during a particular release can be challenging. Furthermore, tracking each lesson learned in order to benefit from the lesson in future releases is cumbersome and time-consuming. Oftentimes, lessons learned are addressed as they arise, which leads to inefficient use of resources for some lessons that may be less valuable than other lessons.

Currently, tracking lessons learned is performed manually, with periodic status meetings to update progress and assign action items in order to close out a lesson learned. Tracking and monitoring the lessons to closure for multiple organizations and multiple releases through a manual process is inefficient and time-consuming. As a result, minimal benefit is realized for the amount of time spent seeing the lessons learned to closure.

Current systems for tracking and monitoring lessons learned typically cannot capture lessons learned as they arise throughout a particular release without manually logging the lessons learned and ranking which lessons to address. In addition, current systems for tracking and monitoring lessons learned require manual monitoring to and that a proper resolution is reached and implemented in future releases. Manually capturing, prioritizing, and tracking lessons learned is both cumbersome and inefficient for improved product development.

BRIEF SUMMARY OF THE INVENTION

The illustrative embodiments provide a computer implemented method, apparatus, and computer program product for managing a lesson learned through a client application. A lesson learned is information describing a task associated with a project. A rating value for the lesson learned is identified using a predefined level matrix. A workflow notification process is generated to address the lesson learned using a notification manager. The lesson learned is monitored throughout the duration of a project.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a block diagram of a record located within a database in accordance with an illustrative embodiment;

FIG. 5 is a block diagram of an input screen having multiple data fields in accordance with an illustrative embodiment;

FIG. 7 is a block diagram of a level matrix having multiple rating criteria and rating values in accordance with an illustrative embodiment;

FIG. 8 is a block diagram of a ranking component having multiple ranking criteria and ranking values in accordance with an illustrative embodiment;

DETAILED DESCRIPTION OF THE INVENTION

Figure 1:
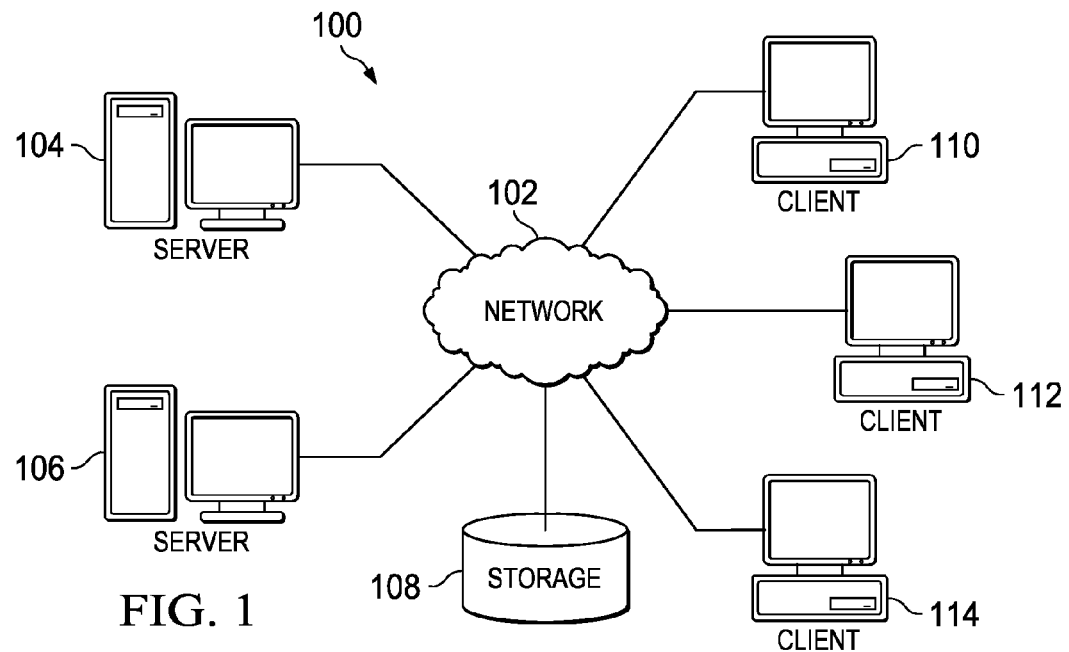
FIG. 1 is a pictorial representation of a network of data processing systems in which illustrative embodiments may be implemented.
Figure 2:
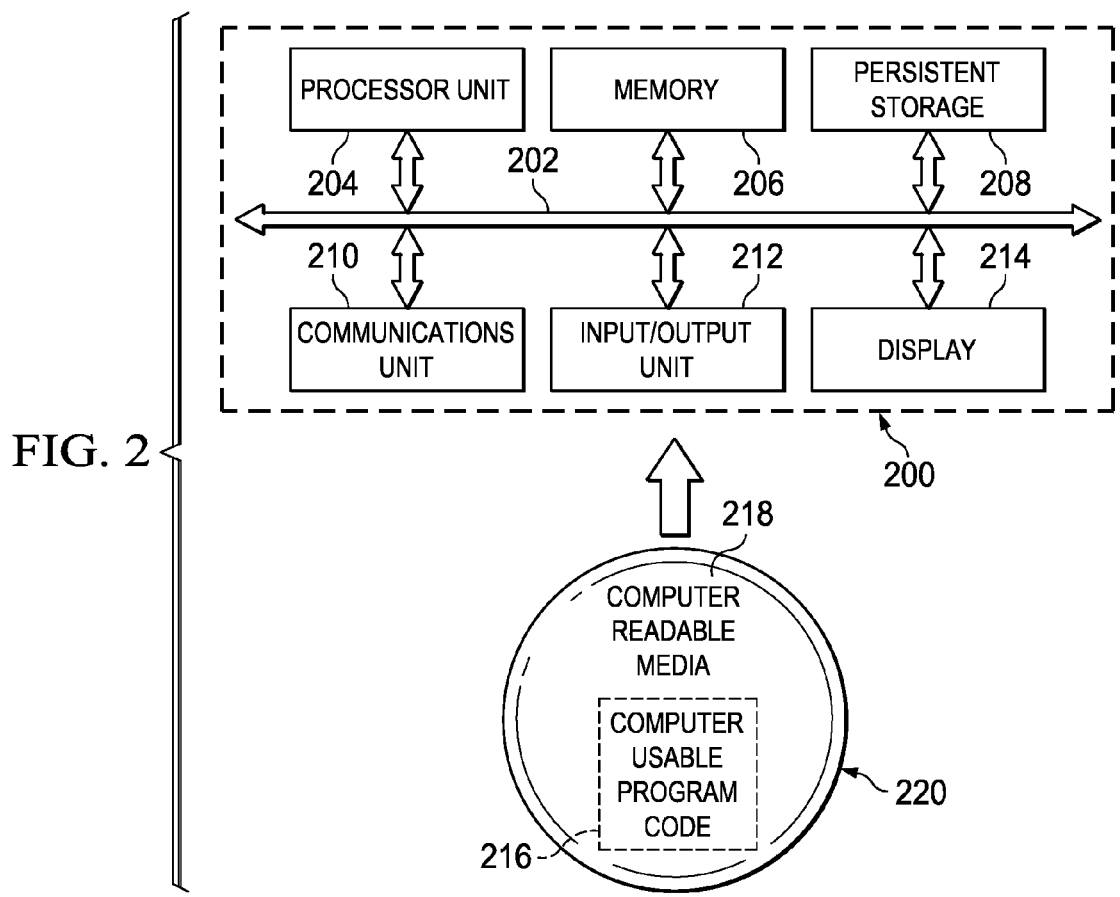
FIG. 2 is a block diagram of a data processing system in which illustrative embodiments may be implemented.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In this example, server 104 includes a lesson learned manager for managing lessons learned during the lifetime of a project.

In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. In FIG. 1, client 110 includes a lessons learned application for permitting a user at client 110 to access lesson learned manager 306 on server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media x18 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments recognize a need for a project management system that is capable of automatically capturing, prioritizing, tracking, and implementing lessons learned in an efficient manner, so as to expedite the implementation of lessons learned while ensuring that priority is given to the lessons with the most potential for positively impacting future releases.

Therefore, the illustrative embodiments provide a computer implemented method, apparatus, and computer program product for managing a lesson learned through a client application. A lesson learned is information describing a task associated with a project. For example, a lesson learned might be a success factor of a previous project that holds specific benefit for future projects if implemented. Another example of a lesson learned would be a negative result within a project that could be addressed and mitigated in future projects. A rating value for the lesson learned is identified using a predefined level matrix. A workflow notification process is generated to address the lesson learned using a notification manager. The lesson learned is monitored throughout the duration of a project.

Figure 3:
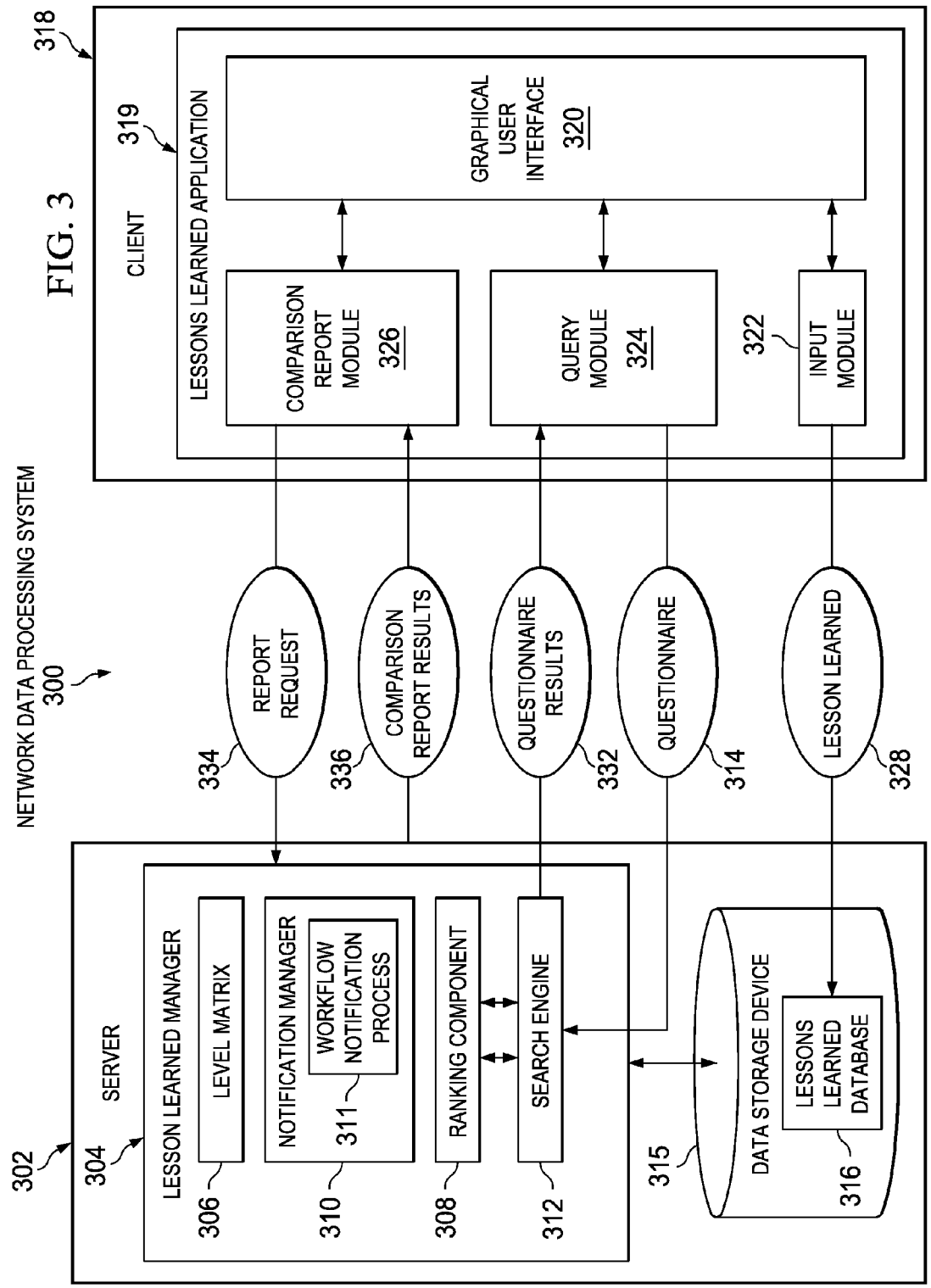
FIG. 3 is a block diagram illustrating a data flow through a computing device when information from an application is used to interact with a management process in accordance with an illustrative embodiment.

FIG. 3 is a block diagram illustrating a data flow through a computing device when information from an application is used to interact with a management process in accordance with an illustrative embodiment. Network data processing system 300 may be implemented using any type of computing device, including, without limitation, a personal computer, laptop, personal digital assistant, a server, or any other computing device depicted in FIGS. 1 and 2.

Server 302 is software maintained in a network environment for providing access and visibility to lessons learned manager 304 for any user at any time. Server 302 may execute on a data processing system, such as data processing system 200 in FIG. 2. Lessons learned manager 304 includes level matrix 306, ranking component 308, notification manager 310, workflow notification process 311, and search engine 312.

Level matrix 306 stores predefined rating values for lessons learned. Ranking component 308 stores predefined ranking criteria and ranking values. These ranking criteria and ranking values correspond to question and answer options of search criteria within questionnaire 314 generated by search engine 312. Notification manager 310 executes workflow notification process 311. Workflow notification process 311 sends automated email notifications throughout the lessons learned process bringing integrity to the process by closing the loop between submitting a lesson learned and resolving any associated action items in a timely and efficient manner. For example, workflow notification process 311 may automatically notify an assigned owner of an action item that is coming due. In this way, notification manager 310 monitors a lesson learned throughout the duration of a project. Search engine 312 can be any search engine that interacts with any web browser client or internal network client.

Server 302 includes data storage device 315 for storing lessons learned database 316. Data storage device 315 may be implemented in any type of known or available device for storing data, such as, without limitation, a hard drive, main memory, a flash memory, or any other type of data storage device. For example, data storage device 315 may be a data store, such as storage 108 in FIG. 1 or memory 206 in FIG. 2.

Lessons learned database 316 contains a plurality of previous lessons learned. A lesson learned is information gained from past and/or present experiences that describes a task associated with a project. Each of the lessons learned within lessons learned database 316 is ranked in accordance with predefined rating values stored in level matrix 306.

Client 318 hosts lessons learned application 319. Lessons learned application 319 contains graphical user interface 320, which allows user visibility and access to lessons learned manager 304 at any time. Client 318 may execute on a data processing system, such as data processing system 200 in FIG. 2. User access to lessons learned manager 304 is necessary in order to input new lessons learned for storage in lessons learned database 316. With ongoing accessibility, any user may input a new lesson learned at any point throughout the duration of a project. This allows lessons learned to be documented as they arise instead of waiting until the end of a project to attempt recall of each lesson learned and the details surrounding that lesson. Documenting lessons learned as they arise also helps to ensure that each lesson is addressed in a timely manner. A user also needs access to lessons learned manager 304 in order to search for previous lessons learned and run comparison reports at the end of a project.

Visibility to lessons learned manager 304 allows any user to view previous lessons learned, the status of ongoing lessons learned, the resolution of lessons learned, and other information stored in lessons learned database 316. Visibility is beneficial to the team members working on a project, in order to ensure all lessons learned are being addressed, as well as to any user who might view the previous lessons learned and implement a lesson learned in a new project to produce a better result.

Lessons learned application 319 provides additional access to lessons learned manager 304 by facilitating user interaction with input module 322, query module 324, and comparison report module 326 through graphical user interface 320. For example, a user inputs lesson learned 328 into input module 322 using graphical user interface 320. Lesson learned 328 is then stored in lesson learned database 316, located on data storage device 315.

Using graphical user interface 320, a user access query module 324 provides the user with questionnaire 314. Questionnaire 314 is generated by search engine 312, and contains search criteria in the form of predefined question and answer options. The predefined question and answer options correspond to predefined ranking criteria and ranking values stored in ranking component 308. The user answers each question contained in questionnaire 314 with a specific answer position. An answer position indicates which of the predefined answer options was selected by the user.

For example, questionnaire 314 may contain three questions, where each question provides three answer options and each answer option is assigned a different position that corresponds to a specific ranking value in ranking component 308. Search engine 312 uses the search criteria of questionnaire 314 to access lessons learned database 316 and select corresponding lessons learned that fit the search criteria of questionnaire 314, such as lesson learned 328. Search engine 312 interacts with ranking component 308 to assign each selected lesson learned a ranked position in a lessons learned list. Ranking component 308 assigns ranked positions based on the ranking criteria and ranking values that correspond to the predefined question and answer options. Search engine 312 then sends the ranked lessons learned list as questionnaire results 332 to query module 324 so that a user can view the ranked results via graphical user interface 320.

After implementing selected lessons learned from questionnaire results 332 into a current project, the user might access comparison report module 326 in order to send comparison report request 334 to lessons learned manager 304. Lessons learned manager 304 runs the report and sends back comparison report results 336 to comparison report module 326 for the user to view using graphical user interface 320. In this example, lessons learned application 319 may be implemented as a search engine or web front end.

Referring now to FIG. 4, a block diagram of a record located within a database in accordance with an illustrative embodiment. Record 400 is an example of a lesson learned stored on a database, such as, but not limited to, lesson learned 328 stored in lesson learned database 316 in FIG. 3.

Record 400 consists of a record identifier 402. Record identifier 402 is a unique identifier of record 400. In the illustrative examples, an identifier is a number, letter, symbol, or any combination of numbers, letters, and symbols used for identification purposes. Lesson 404 is the lesson learned associated with identifier 402. Release 406 is a particular project from which lesson learned 404 was derived. Lesson 404 was submitted by submitter 408 upon completion of release 406.

Status 410 indicates what stage lesson 404 is in, and whether it has been addressed, is being addressed, or has not yet been addressed during the lifetime of a particular project. For example, status 410 may indicate a closed status, which would mean that lesson 404 was addressed and resolved. Rating value 412 is a symbol that indicates the priority of lesson 404. For example, rating value 412 could be 2, which would indicate a high priority according to a predefined level matrix such as level matrix 306 in FIG. 3. Field positive 414 is a yes/no field that indicates whether or not lesson 404 was a positive or negative lesson learned. If lesson 404 is a positive lesson learned, action item 416 is automatically created in order to ensure implementation of lesson 404 in future releases. If lesson 404 is not a positive lesson learned, submitter 408 may create action item 416 in order to mitigate lesson 404 in future releases.

FIG. 5 is a block diagram of an input screen having multiple data fields in accordance with an illustrative embodiment. Lessons learned input module 500, illustrative of input module 322 in FIG. 3, contains data fields that gather data such as that found in record 400 in FIG. 4. A graphical user interface, such as graphical user interface 320 in FIG. 3, displays the input screen of lessons learned input module 500.

Lessons learned input module 500 stores creator 502 identification information. Creator 502 may be any person with update rights for lessons learned, who can create or update lessons learned as a submitter or as a proxy to another submitter. If creator 502 is not submitter 510, creator 502 will not have authority to later accept or reject any action items associated with lesson learned 506. Submitter 510 is the person responsible for submitting lesson learned 506 creating any associated action items, such as action item 518, and accepting or rejecting action resolutions to action items associated with lesson learned 506, such as submitter 408 in FIG. 4.

Identifier 504 is a unique identifier that corresponds to lesson learned 506. Release 508 indicates the version of the project from which lesson learned 506 is derived. Status 512 indicates the state of lesson learned 506. For example, when action item 518 is created, status 512 indicates an open status. Once all meetings to determine ownership, target dates, and tasks for action item 518 have taken place, status 512 indicates an in progress status. When action item 518 has been resolved or completed, or once a positive lesson learned meeting is held to discuss ongoing support for the process, status 512 indicates a closed status.

Level criteria 514 indicates the complexity or expected difficulty of implementing lesson learned 506 and the impact on future projects if lesson learned 506 is implemented. In other words, level criteria 514 are used by a predefined level matrix, such as level matrix 306 in FIG. 3 to assign a rating value, such as rating value 412 in FIG. 4, to lesson learned 506.

Field positive 516 allows submitter 510 to indicate whether lesson learned 506 is a positive lesson or negative lesson. If lesson learned 506 is a positive lesson, then action item 518 is automatically created. For example, if submitter 510 selects "yes" in field positive 516, lesson learned manager 304 in FIG. 3 automatically creates action item 518 entitled "positive lesson learned—continue supporting this process for future release." If lesson learned 506 is a negative lesson, the submitter may still create action item 518 in order to address the negative impact of lesson learned 506 and ensure the same problems associated with the negative lesson does not arise in future releases.

Figure 6:
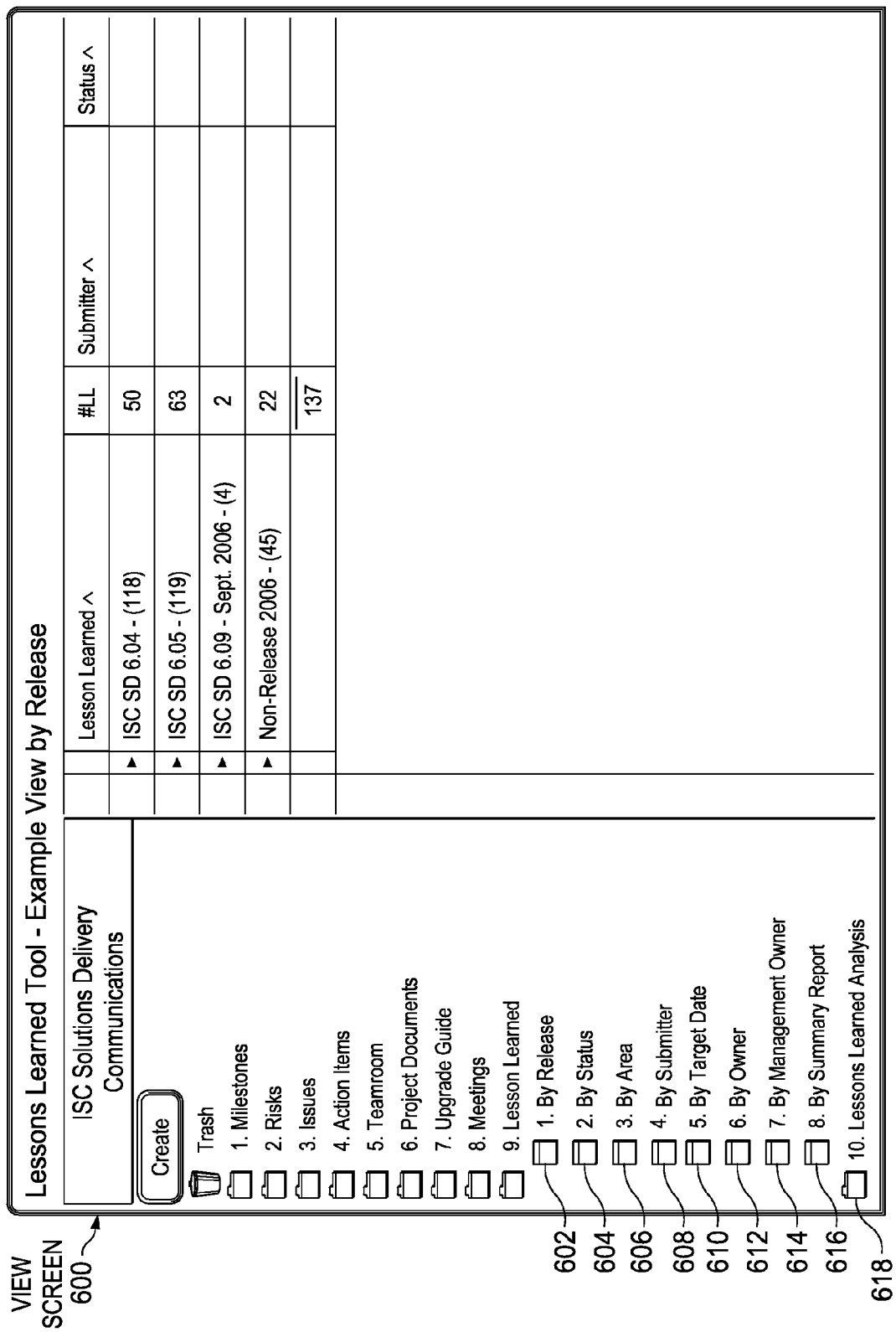
FIG. 6 is a block diagram of a view screen having multiple data view options in accordance with an illustrative embodiment.

FIG. 6 is a block diagram of a view screen having multiple data view options in accordance with an illustrative embodiment. FIG. 6 represents possible view options. FIG. 6 is not intended to provide architectural or display limitations. The illustrative embodiments may be implemented using fewer view options than is shown in FIG. 6 and/or additional view options not shown in FIG. 6. View screen 600 is displayed to a user by a query module, such as query module 324 in FIG. 3, through a graphical user interface, such as graphical user interface 320 in FIG. 3.

In this example, a user queries a database, such as lessons learned database 316 in FIG. 3, for previous lessons learned. The user query may be routed through a search engine, such as search engine 312 in FIG. 3, which interacts with the database to select applicable lessons learned and return those as results to the user. To view the results of the query, the user may select from several view options, such as "By Release View" 602, "By Status View" 604, "By Area View" 606, "By Submitter View" 608, "By Target Date View" 610, "By Owner View" 612, or "By Management Owner View" 614. Alternatively, a user may select "Summary Report" 616 to receive an overview of the status of all active lessons.

For example, a user may submit a query for a specific date and lessons learned manager 304 in FIG. 3 will automatically determine which lessons learned are past due or will be coming due within the next two weeks from the submitted date, and return the result to Summary report 616 for the user to view. Summary report 616 is useful for status report meetings, and minimizes the manual maintenance and tracking traditionally involved in monitoring lessons learned, ensuring that lessons learned are closed within the stipulated time frame.

A user might also select Lessons Learned Analysis 618, which provides, for example, results from previous comparison reports, such as comparison report results 336 in FIG. 3, and also root cause analyses of previous comparison reports indicating a failure to mitigate all selected lessons learned for incorporation into that particular project.

FIG. 7 is a block diagram of a level matrix having multiple level criteria and rating values in accordance with an illustrative embodiment. FIG. 7 represents possible level criteria options. FIG. 7 is not intended to provide architectural or display limitations. The illustrative embodiments may be implemented using fewer level options than is shown in FIG. 7 and/or additional level options not shown in FIG. 7.

In this example, level matrix 700 contains two level criteria. Complexity to implement criteria 706 corresponds to complexity to implement in level criteria 514 in FIG. 5. Likewise, positive impact if implemented criteria 704 corresponds to impact if implemented in level criteria 514 in FIG. 5. When a user selects from the levels within level criteria 514 in FIG. 5, level matrix 700 automatically returns a rating value based on predetermined values that correspond to the combination of selected level criteria.

In one embodiment, complexity to implement 706 has levels low 702, medium 708, and high 710. Low 702 indicates only one group or person needs to implement the lesson learned, or that it is very simple to implement. High 710 indicates that either multiple groups need to implement the lesson learned, or that it is very difficult to implement. For example, a lesson learned might be very difficult to implement because it requires lengthy analysis, extended amounts of time, or large amount of coding to implement. Medium 708 incorporates anything that is not high or low.

Positive impact if implemented 704 has levels high, medium, and low as well. A positive impact if implemented level of high indicates that the positive impact affects a large number of people or that the process or operation can not function without this implementation. A positive impact if implemented level of low indicates that the positive impact is limited to a few individuals or is merely "nice to have" but not crucial to the process or operation. A positive impact if implemented level of medium incorporates anything that is not high or low.

When a user inputs level criteria of complexity to implement 706 at level medium 708, and positive impact if implemented 704 at level low 712, level matrix 700 automatically returns a rating value of 8 714. Multiple variations of level criteria can be predetermined in level matrix 700 in order to prioritize values of lessons learned and the order of importance to implement.

FIG. 8 is a block diagram of a ranking component having multiple ranking criteria and ranking values in accordance with an illustrative embodiment. Ranking component 800, illustrative of ranking component 308 in FIG. 3, contains predefined question and answer options with corresponding ranking values. FIG. 8 represents possible ranking criteria and ranking value options. The embodiment shown in FIG. 8 is not intended to provide architectural or display limitations. The illustrative embodiments may be implemented using fewer ranking criteria and ranking value options than is shown in FIG. 8 and/or additional ranking criteria and ranking value options not shown in FIG. 8.

In this example, ranking component 800 contains question 1 802, question 2 804, and question 3 806. Each question has corresponding answer options. For example, question 1 802 has three answer options, answer A 808, answer B 810, and answer C 812. Likewise, question 2 804 has three answer options, answer A 814, answer B 816, and answer C 818.

When a client initiates a search for previous lessons learned, a search engine, such as search engine 312 in FIG. 3, generates a questionnaire, such as questionnaire 314 in FIG. 3. The questionnaire may contain the same predefined question and answer options stored in ranking component 800. For example, the questionnaire could contain question 1 802, question 2 804, and question 3 806.

When the client completes the questionnaire by choosing answer options for each question, the search engine interacts with a lessons learned database, such as lessons learned database 316, to locate applicable lessons learned. The search engine then interacts with ranking component 800 to rank each applicable lesson learned based on the position of each answer to a question. A position refers to the answer option chosen by a client. For example, for question 1 802, first position might be answer A 808, second position might be answer B 810, and third position might be answer C 812.

Based on the answer position of each question, a corresponding ranking value is assigned to the applicable lesson learned found by the search engine for that question. For example, the search engine might find a lesson learned, such as lesson learned 328 in FIG. 3, that is applicable to question 1 802. The client may have selected the second answer position, answer B 810, for question 1 802, which corresponds to a ranking value of 6 820. The search engine may also find another lesson learned that is applicable to question 2 804. The client might also select the second answer position, answer B 816, for question 2 804, which corresponds to a ranking value of 1 822. The applicable lesson learned found for question 2 804 would have a higher ranking than the applicable lesson learned found for question 1 802. Thus, the lessons learned list returned to the client in the form of questionnaire results, such as questionnaire results 332 in FIG. 3, will be a ranked lessons learned list.

Each lesson learned found by the search engine in response to a questionnaire will only appear once in a given ranked lessons learned list.

In one embodiment, if a particular lesson learned is found to be applicable to both question 1 802 and question 2 804, each with a different ranking value based on the answer position chosen by the client, the particular lesson learned will be given the higher of the two ranking values, appearing once in the list with the highest corresponding ranking value. The ranking process automatically prioritizes lessons learned with higher importance for a particular project, allowing resources to be used more efficiently by addressing lessons learned with the most potential benefit first.

In another embodiment, the particular lesson learned found to be applicable to both question 1 802 and question 2 804, each with a different ranking value based on the answer position chosen by the client, the particular lesson learned will be presented to the user with an adjusted ranking. The adjusted ranking may be a ranking score that is intermediate between the higher ranking and the lower ranking.

Figure 9:
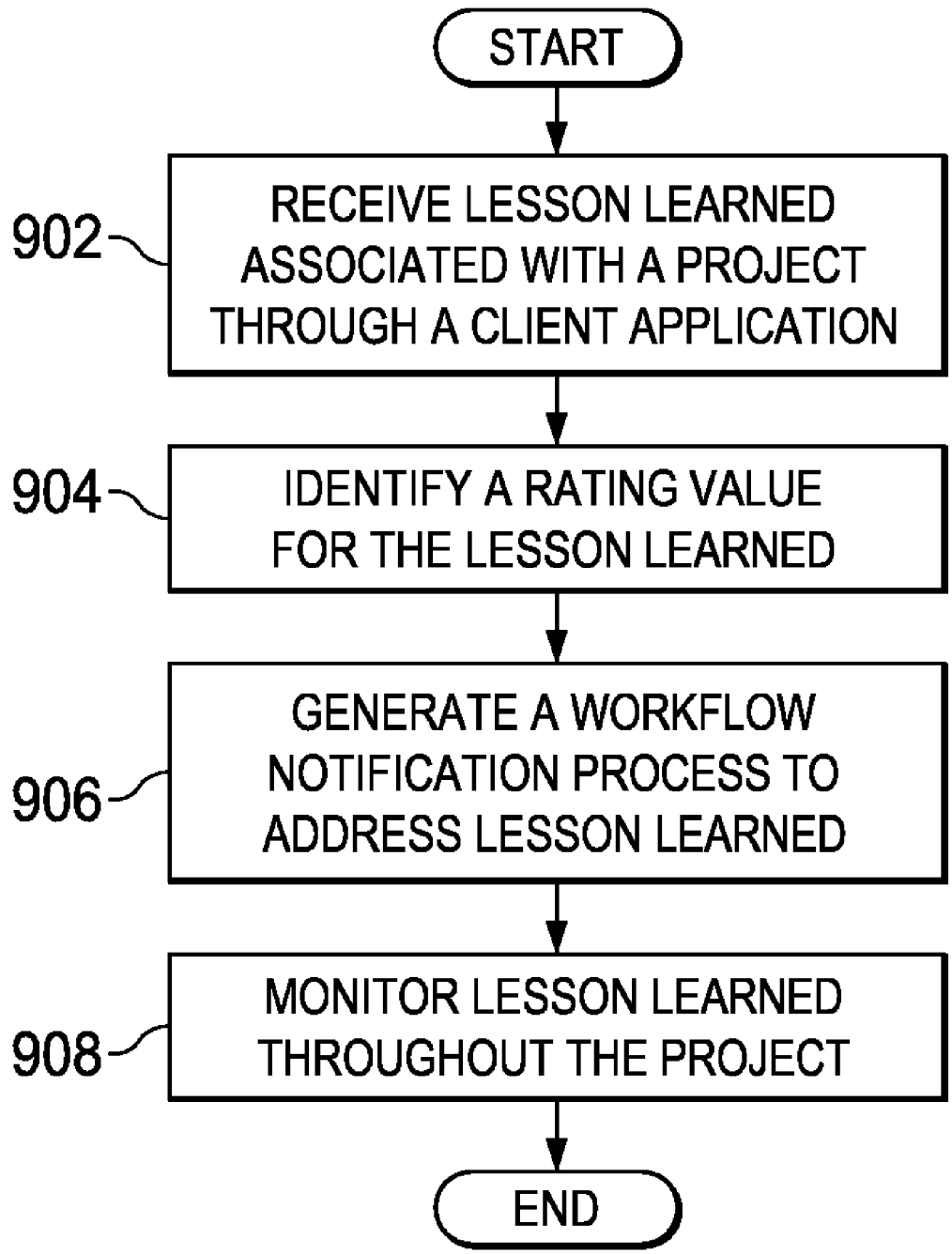
FIG. 9 is a flowchart illustrating a process for managing a lesson learned in a closed loop process in accordance with an illustrative embodiment.

FIG. 9 is a flowchart illustrating a process for managing a lesson learned in a closed loop process in accordance with an illustrative embodiment. The process in FIG. 9 is implemented by software for managing lessons learned, such as lessons learned manager 304 in FIG. 3.

The process begins by receiving a lesson learned associated with a project through a client application (step 902). Any team members can enter or log a lesson learned throughout the duration of the project. After the process receives a lesson learned, the process identifies a rating value for the lesson learned (step 904). A rating value, such as rating value 714 in FIG. 7, is determined using a predefined level matrix, such as level matrix 306 in FIG. 3. Next, the process generates a workflow notification process to address the lesson learned (step 906). The workflow notification process, such as workflow notification process 311 in FIG. 3, is executed by a notification manager, such as notification manager 310 in FIG. 3.

The workflow notification process sends automatic emails throughout the duration of a project. For example, the workflow notification process sends an automatic email to an owner whenever the process receives an owner assignment for a lesson learned. In another example, the workflow notification process sends an automatic email to an owner about an upcoming due date on an action item associated with the assigned lesson learned. In yet another example, the workflow notification process sends an automatic email to a submitter when the process receives the owner's resolution of an action item. In this way, the process monitors the lesson learned throughout the duration of the project (step 908) with the process terminating thereafter.

Figure 10:
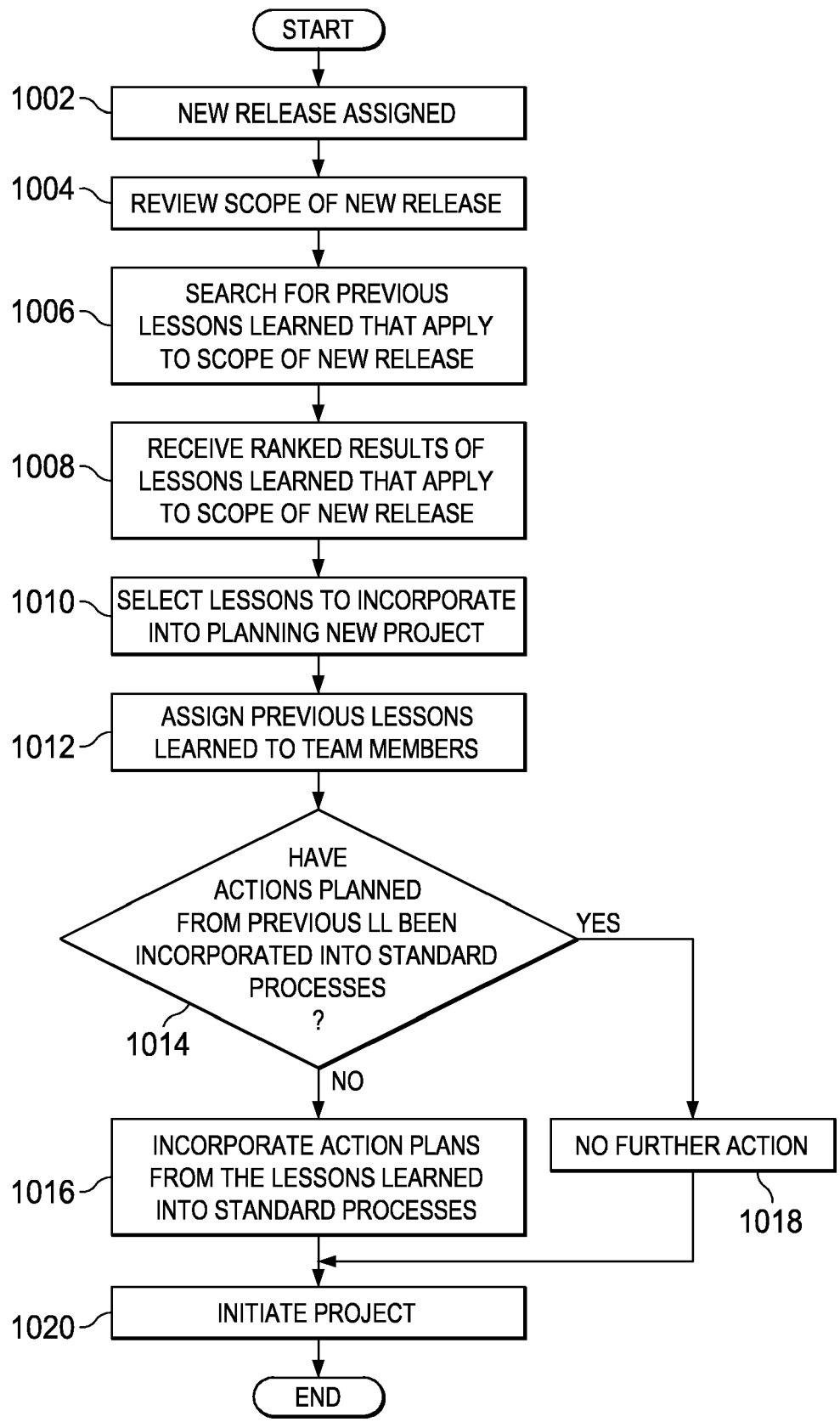
FIG. 10 is a flowchart illustrating a process for selecting and incorporating previous lessons learned into a new release in accordance with the illustrative embodiment.

FIG. 10 is a flowchart illustrating a process for selecting and incorporating previous lessons learned into a new release in accordance with the illustrative embodiment. The process in FIG. 10 is implemented by a human user, such as a project manager. When a new release is assigned, the project manager will conduct a planning session to review previous lessons learned and incorporate all appropriate tasks into the project planning.

The process begins by assigning a new release (step 1002). Next, the project manager reviews the scope of the new release (step 1004) and searches for previous lessons learned that apply to the scope of the new release (step 1006). For example, the project manager searches for previous lessons learned using a query module, such as query module 324 in FIG. 3, to submit a questionnaire, such as questionnaire 314 in FIG. 3. The questionnaire is received by a search engine, such as search engine 312 in FIG. 3. The search engine then interacts with a database, such as lessons learned database 316 in FIG. 3, to select applicable lessons learned to return as questionnaire results, such as questionnaire results 332 in FIG. 3, to the query module.

The project manager receives ranked results of lessons learned that apply to the scope of the new release (step 1008). The project manager can view the results returned to the query module through a graphical user interface, such as graphical user interface 319 in FIG. 3. Next, the project manager selects lessons learned from the ranked results to incorporate into planning the new project (step 1010). The project manager's selection of lessons learned to incorporate into the project is based on the ranking of each lesson learned within the ranked results. The ranking is determined by a ranking component such as ranking component 308 in FIG. 3. The project manager may select lessons learned individually or based on the ranking value. For example, a project manager might select individual lessons that the project manager determines are particularly relevant or, alternatively, all lessons learned with a ranking value of 2.

In another embodiment, the lessons learned manager, such as lessons learned manager 304 in FIG. 3, automatically selects lessons learned based on the ranking value. For example, returning to step 1006, when the project manager initiates a search for previous lessons learned that apply to the scope of the new release, the lessons learned manager automatically selects all lessons learned with a ranking value of 2 from the ranked results generated by the search engine, such as search engine 312 in FIG. 3. In this embodiment, the project manager receives the automatically selected lessons learned to incorporate into planning the new project, combining steps 1008 and 1010.

Next, the project manager assigns the selected previous lessons learned to team members (step 1012) to ensure the lessons learned are addressed in the new release. The team members determine whether the assigned previous lessons learned have been incorporated into standard processes (step 1014). If the previous lessons learned have not been incorporated into standard processes, the team members incorporate the action plans from the previous lessons learned into standard processes (step 1016) and then initiate the project (step 1020) with the process terminating thereafter.

Returning to step 1014, if the previous lessons learned have been incorporated into standard processes, no further action is taken (step 1018) and the project is initiated (step 1020) with the process terminating thereafter.

Figure 11:
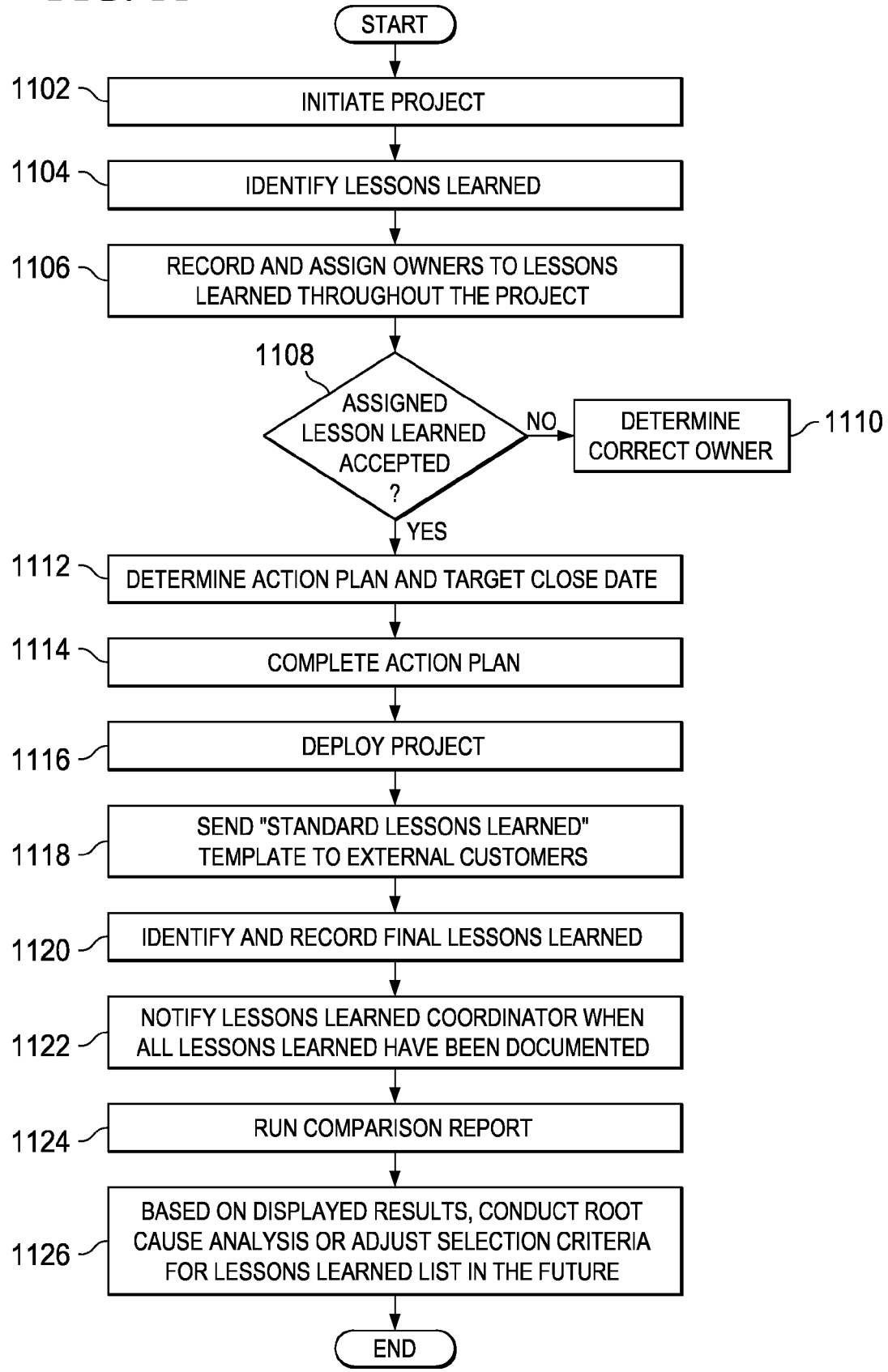
FIG. 11 is a flowchart illustrating a process for assigning and monitoring lessons learned throughout the duration of a project in accordance with the illustrative embodiment.

FIG. 11 is a flowchart illustrating a process for assigning and monitoring lessons learned throughout the duration of a project in accordance with the illustrative embodiment. The process in FIG. 11 is implemented by a human user, such as a project manager.

The process begins by initiating the project (step 1102). The project manager identifies previous lessons learned (step 1104) that apply to the current project. Any team members can enter or log a lesson learned throughout the duration of the project. The project manager records and assigns owners to each applicable lesson learned throughout the duration of the project (step 1106). For example, the project manager may input an owner assignment for a particular lesson learned using an input module, such as input module 322 in FIG. 3. Once an owner assignment is input, a notification manager, such as notification manager 311 in FIG. 3, sends an automatic email notification to the assigned owner. Each assigned owner makes an individual decision to accept or reject their assigned lesson learned (step 1108) based on whether or not they are the correct owner for that lesson learned.

If an assigned owner rejects the assigned lesson learned, the project manager determines the correct owner (step 1110). If an assigned owner accepts the assigned lesson learned the assigned owner commits to complete any action items associated with the lesson learned and see the lesson learned through to closure. This is an improvement over traditional methods of making a random assignment of a lesson learned to a team member without obtaining any personal commitment from that team member to follow through with the lesson learned.

The assigned owner together with the project manager determines if an action plan is required, in accordance to the level rating assigned from a level matrix, such as level matrix 700 in FIG. 7. If it is determined that an action plan needs to be created, the assigned owner together with the project manager determines an action plan and target close date (step 1112) for the assigned lesson learned. For example those lessons that received a level rating of 7 through 9 may not require any action, lessons with a level rating of 1 through 3 may need to have a completed action plan prior to deployment and lessons with a level rating of 4 through 6 may have an action plan that completes after deployment. The owner completes the action plan (step 1114) and the project deploys (step 1116). Next, the project manager sends a standard lessons learned template to external customers (step 1118) to gather additional lessons learned for the project to utilize in future releases. The standard lessons learned template should match the lessons learned database, such as lessons learned database 316 in FIG. 3, in order to effectively upload the completed template into the database. After all lessons learned are identified, including those received from external customers, the project manager identifies and records final lessons learned (step 1120). The project manager then notifies the lessons learned coordinator that all lessons learned have been documented (step 1122) for that project. The project manager runs a comparison report (step 1124) to determine if all applicable lessons learned were incorporated into the project and if all previous lessons learned selected for incorporation were properly mitigated in the current project. In order to run a comparison report, the project manager accesses a comparison report module, such as comparison report module 326 in FIG. 3. The comparison report module will send the project manager's report request to the lessons learned manager, such as lessons learned manager 304 in FIG. 3. Lessons learned manager uses a search engine, such as search engine 312 in FIG. 3, to access a database, such as lessons learned database 316 in FIG. 3, and run the requested comparison report. Based on the comparison report's displayed results, the project manager conducts a root cause analysis or adjusts the selection criteria for the lessons learned list in the future (step 1126) with the process terminating thereafter.

In this embodiment, unlike in the prior art, the owner commitment is to assigned action items.

Figure 12:
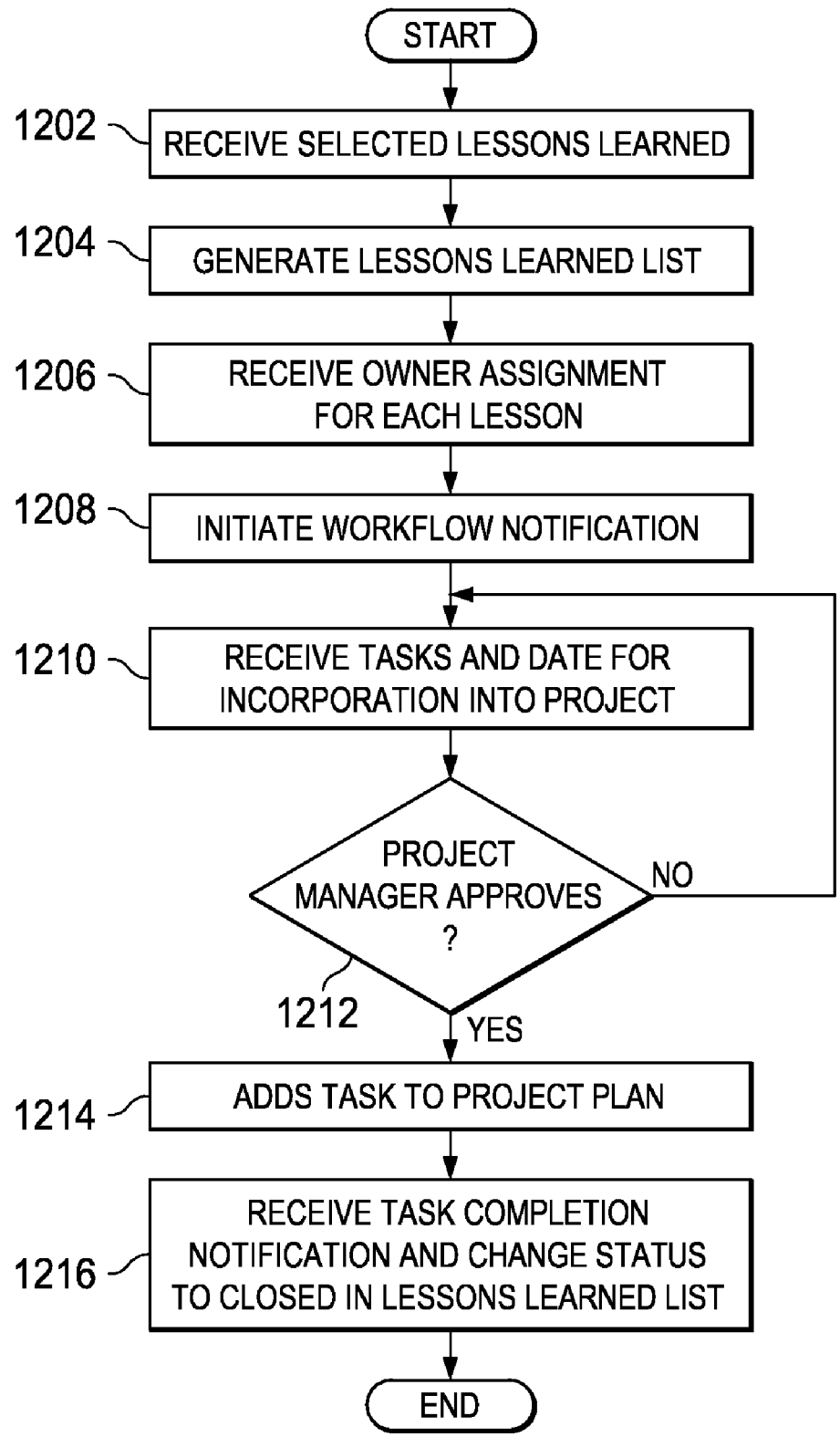
FIG. 12 is a flowchart illustrating a workflow driver process in accordance with the illustrative embodiment.

FIG. 12 is a flowchart illustrating a process for managing lessons learned in accordance with the illustrative embodiment. The process in FIG. 12 is implemented by software for managing lessons learned, such as lessons learned manager 304 in FIG. 3.

The process begins by receiving selected lessons learned (step 1202). The selected lessons learned may be received when a user, searching for previous lessons learned, as in step 1006 in FIG. 10, selects from ranked results, as in step 1010 in FIG. 10. The process generates a lessons learned list (step 1204). Then the process receives an owner assignment for each lesson (step 1206) and automatically initiates workflow notification (step 1208), which sends automatic email notifications to assigned owners of each lesson.

After the assigned owners receive the automatic email notification, the assigned owners respond and the process receives tasks and dates for incorporation into the project (step 1210). Next, the process automatically sends an email notification to the project manager with the tasks and dates submitted by each assigned owner, for project manager approval (step 1212). If the project manager does not approve, the process sends an automatic email notification to the assigned owner, requiring the assigned owner to resubmit tasks and dates for incorporation into the project (step 1210). If the project manager approves, the process automatically adds the approved tasks and dates to the project plan (step 1214). Once the tasks are complete, the process receives task completion notification and changes the status of the lesson learned to a closed status in the lessons learned list (step 1216) with the process terminating thereafter.

Figure 13:
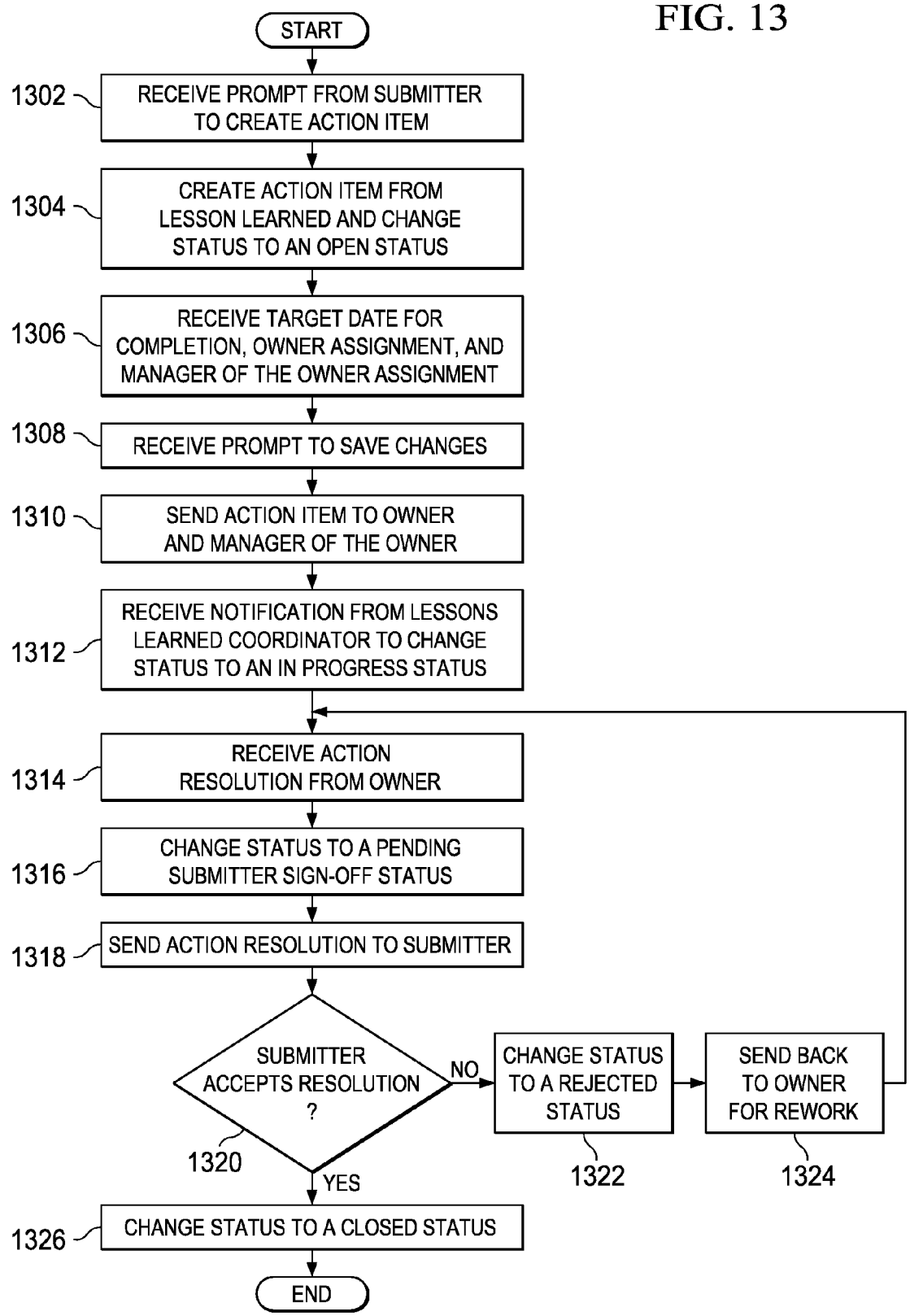
FIG. 13 is a flowchart illustrating a process for creating and resolving an action item in accordance with the illustrative embodiment.

FIG. 13 is a flowchart illustrating a process for creating and resolving an action item in accordance with the illustrative embodiment. The process in FIG. 13 is implemented by software for managing lessons learned, such as lesson learned manager 304 in FIG. 3.

After saving a lesson learned, an action item may automatically be created, or a user may choose to create an action item. Whenever an action item is created from a lesson learned, the release for the lesson learned is automatically populated into the field indicating the release for the action item. The following process is one embodiment in which a user creates an action item from a lesson learned. This illustrative process does not limit the invention in any way.

The process begins by receiving a prompt from a submitter to create an action item (step 1302). The process creates an action item from the lesson learned and changes the status of the lesson learned to an open status (step 1304). Next, the process receives a target date for completion, owner assignment, and manager of the owner assignment (step 1306). After the process receives a prompt to save changes (step 1308), the process automatically sends the action item to the assigned owner and manager of the owner (step 1310).

Once the lessons learned coordinator meets with the owner and manager of the owner to determine correct ownership and receive commitment from the owner to complete the action item, the process receives notification from the lessons learned coordinator and changes the status of the lesson learned to an in progress status (step 1312). When the process receives the action resolution from the owner (step 1314), the process changes the status of the lesson learned to a pending submitter sign-off status (step 1316) and automatically sends the action resolution to the submitter (step 1318).

The submitter must accept or reject the resolution (step 1320). If the submitter rejects the resolution, the process changes the status to a rejected status (step 1322) and automatically sends the action item back to the owner for rework (step 1324). If the submitter accepts the resolution, the process changes the status to a closed status (step 1326) with the process terminating thereafter.

Figure 14:
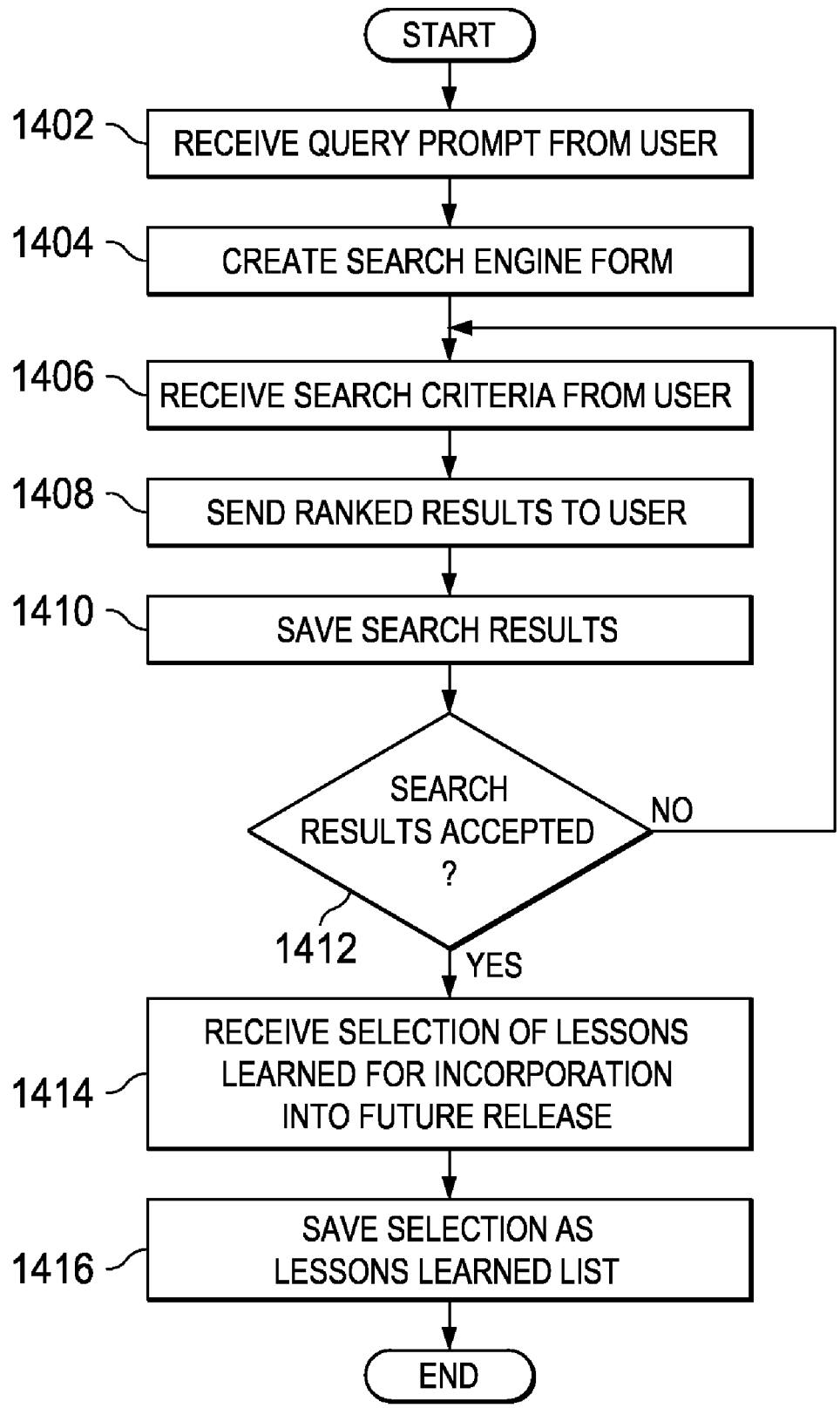
FIG. 14 is a flowchart illustrating a process for submitting a query in order to receive ranked results to select from and incorporate into future releases in accordance with the illustrative embodiment.

FIG. 14 is a flowchart illustrating a process for submitting a query in order to receive ranked results to select from and incorporate into future releases in accordance with the illustrative embodiment. The process in FIG. 14 is implemented by software for managing lessons learned, such as lesson learned manager 304 in FIG. 3.

When a project manager initiates a search for previous lessons learned to incorporate into their project planning, the project manager will access the lessons learned database, such as lessons learned database 316 in FIG. 3, through a search engine, such as search engine 312 in FIG. 3, and initiate a search engine form.

The search engine form is a questionnaire comprised of predefined questions and answer options that apply to the scope of the project. For example, a questionnaire might include questions asking the complexity of development required for a solution and whether or not the solution crosses multiple functions and/or applications. In addition to predefined questions, users can also enter key words and select, for example, without limitation, one of the following search criteria: exact match, fuzzy search, multiple words, or date range.

The process begins by receiving a query prompt from the user (step 1402). The process creates a search engine form (step 1404) to display to the user, then receives search criteria from the user (step 1406) utilizing the search engine form. Using the search criteria, the search engine accesses the lessons learned database, and returns ranked results to the user (step 1408) via the lessons learned application, then saves the ranked results (step 1410). Ranked results refer to the ranking value assigned to each lesson learned by a ranking component, such as ranking component 308 in FIG. 3. The user must then decide whether the ranked results returned are acceptable (step 1412).

If the user does not accept the results, the user will undo the previous search criteria, and submit new search criteria, which the process will receive again (step 1406). If the user accepts the results, the process will then receive the user selection of lessons learned for incorporation into future releases (step 1414) and will save the selection as a lessons learned list (step 1416) with the process terminating thereafter. The lessons learned list is saved using a unique identifier of the given release plus the user identifier (ID). This action will ensure that future view of lessons learned list will contain only one set of lessons learned documents under a given release name with the user id. When a user selects lessons learned for the future release, the user may select by rank (i.e. select all lessons learned with a rating value of "2") or select individually.

Figure 15:
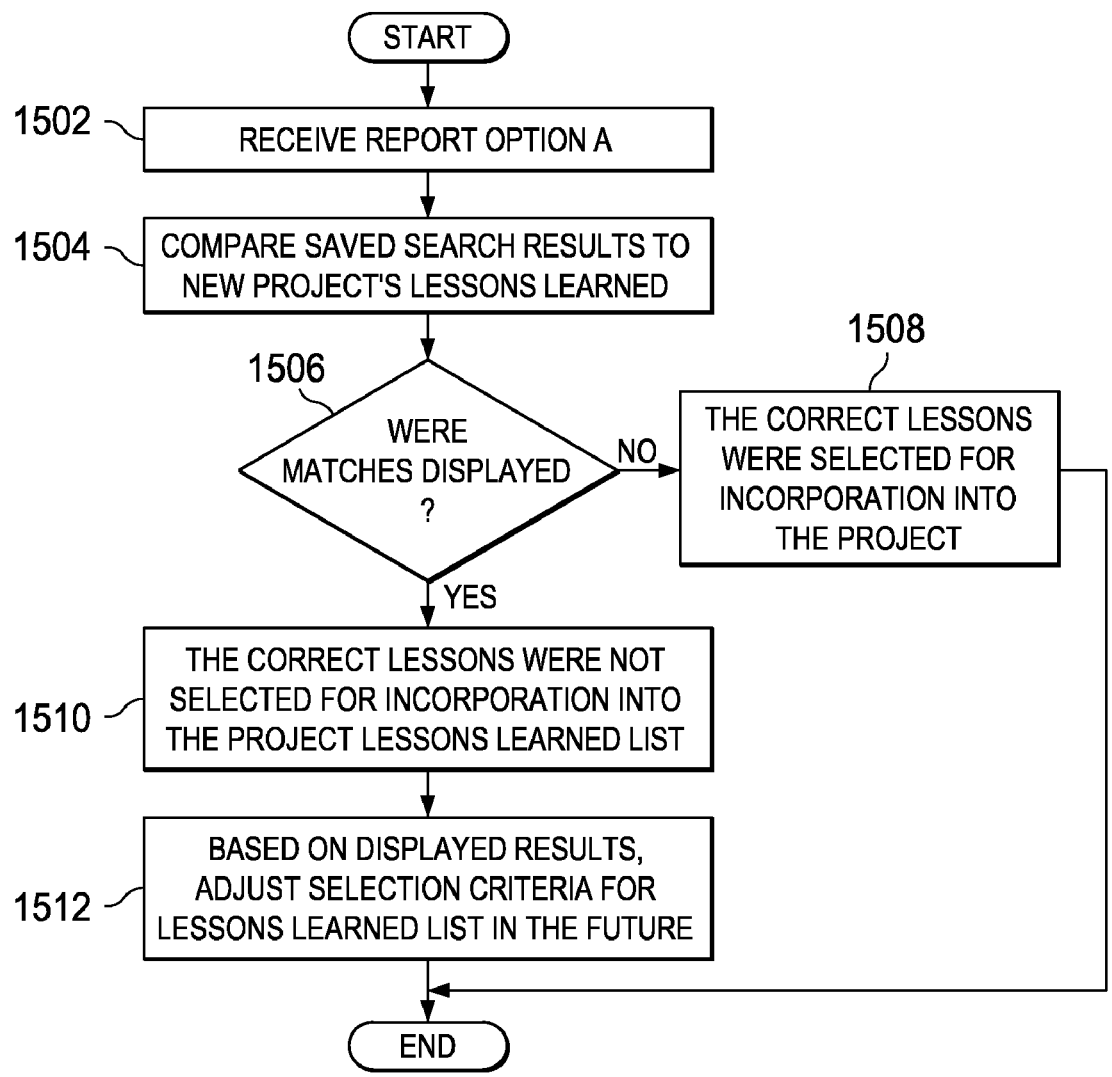
FIG. 15 is a flowchart illustrating a process for identifying whether or not the correct lessons were incorporated into a project in accordance with the illustrative embodiment.

FIG. 15 is a flowchart illustrating a process for identifying whether or not the correct lessons were incorporated into a project in accordance with the illustrative embodiment. The process in FIG. 15 is implemented by software for managing lessons learned, such as lesson learned manager 304 in FIG. 3. When a user chooses to run a comparison report, for example, two options may be available for selection. FIG. 15 is illustrative of one option and is not intended to limit the invention in any way.

The process begins by receiving user selection of report option A (step 1502). The process compares saved search results to the new project's lessons learned (step 1504). The saved search results may be, for example, the saved search results of an initial query such as those in FIG. 14. The new project's lessons learned may be, for example, those lessons learned documented throughout the duration of the project, submitted by team members and external customers.

Once the comparison report is run, the process reports on matches displayed, if any (step 1506). If no matches were displayed, the correct lessons were selected for incorporation into the project (step 1508) with the process terminating thereafter. If matches were displayed, the correct lessons were not selected for incorporation into the project lessons learned list (step 1510) and based on the displayed results, the process adjusts the selection criteria for lessons learned in the future (step 1512) with the process terminating thereafter.

Figure 16:
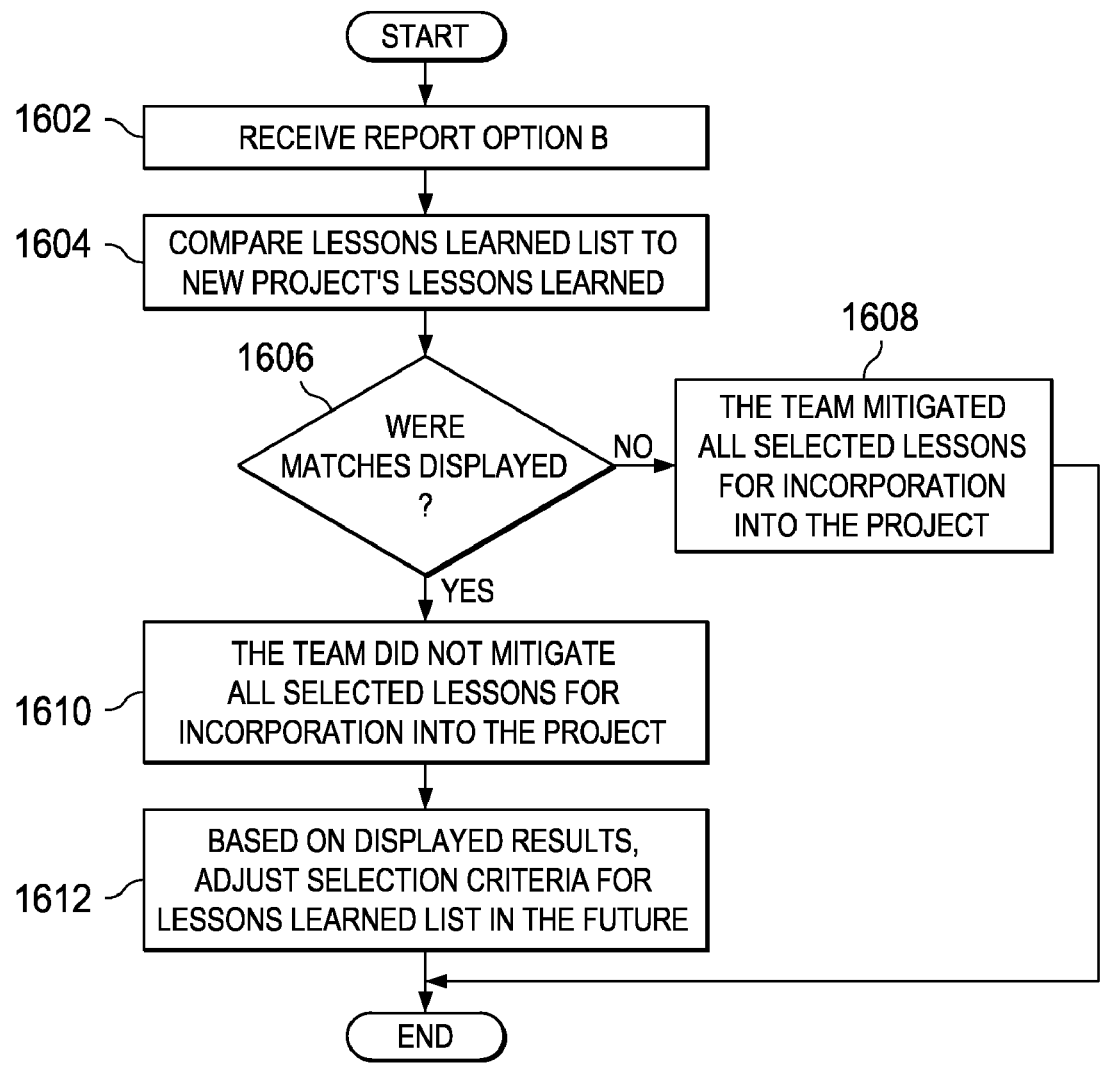
FIG. 16 is a flowchart illustrating a process for identifying whether or not a team mitigated the selected lessons that were incorporated into a project in accordance with the illustrative embodiment.

FIG. 16 is a flowchart illustrating a process for identifying whether or not a team mitigated the selected lessons that were incorporated into a project in accordance with the illustrative embodiment. The process in FIG. 16 is implemented by software for managing lessons learned, such as lesson learned manager 304 in FIG. 3. Similar to FIG. 15, FIG. 16 is illustrative of one illustrative embodiment and is not intended to limit the manner in which other embodiments may be implemented in any way.

The process begins by receiving user selection of report option B (step 1602). The process compares the lessons learned list to the new project's lessons learned (step 1604). The lessons learned list may be, for example, the lessons learned selection saved from an initial query such as those in FIG. 14. The new project's lessons learned may be, for example, those lessons learned documented throughout the duration of the project, submitted by team members and external customers.

Once the comparison report is run, the process reports on matches displayed, if any (step 1606). If no matches were displayed, the team mitigated all selected lessons for incorporation into the project (step 1608) with the process terminating thereafter. If matches were displayed, the team did not mitigate all selected lessons for incorporation into the project (step 1610) and based on the displayed results, the process adjusts selection criteria for lessons learned in the future (step 1612) with the process terminating thereafter Thus, the illustrative embodiments provide a computer implemented method, apparatus, and computer program product for receiving a lesson learned, which is a key piece of information gained from past and present experience that can be used in the future for specific benefit, through a client application, identifying a rating value for the lesson learned using a predefined level matrix, generating a workflow notification process to address the lesson learned using a notification manager, and monitoring the lesson learned throughout the duration of a project.

In this manner, some or all of the illustrative embodiments provide a data processing system that is capable of automatically capturing, prioritizing, tracking, and implementing lessons learned in an efficient manner, so as to expedite the implementation of lessons learned while ensuring that priority is given to the lessons with the most potential for positively impacting future releases.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for managing lessons learned in a closed loop process, the computer implemented method comprising:
   receiving a lesson learned associated with a project through a client application, wherein the lesson learned comprises information describing a task associated with a project;
   identifying, using a processor unit, a rating value for the lesson learned received from the client application, wherein the rating value is determined by combining a plurality of criteria in a predefined level matrix, wherein the predefined level matrix contains the rating value for each combination of the plurality of criteria;
   generating a workflow notification process to address the lesson learned, wherein the workflow notification process is executed by a notification manager; and
   monitoring the lesson learned for a duration of the project,
   wherein the plurality of criteria comprise a complexity to implement the lesson learned criteria and a positive impact of implementing the lesson learned criteria, wherein the each of the plurality of criteria is further comprised of one or more levels, and wherein each of the one or more levels corresponds to the rating value.

2. The computer implemented method of claim 1, further comprising:
   creating an action item associated with the lesson learned, wherein the action item comprises at least a target date for completion, an owner assignment, and a manager of the owner assignment, and wherein the target date for completion, the owner assignment, and the manager of the owner assignment is received from a submitter;
   sending the action item to an owner;
   receiving an action resolution from the owner in response to sending the action item;
   forwarding the action resolution to the submitter;
   receiving the submitter response to the action resolution; and
   changing the status of the action item accordingly.

3. The computer implemented method of claim 2, wherein the owner accepts or rejects the action item as being assigned to the correct owner.

4. The computer implemented method of claim 2, further comprising:
   changing the status of the action item to an open status when the action item is created; and
   changing the status of the action item to an in progress status upon receiving a notification by a lessons learned coordinator, wherein the notification by the lessons learned coordinator occurs once a meeting has been held and the owner has committed to the action item.

5. The computer implemented method of claim 2 further comprising:
   responsive to a submission of the action resolution by the owner, changing the status of the action item to a pending submitter sign-off status; and
   responsive to a response of the submitter to the action resolution indicating acceptance, changing the status of the action item to a closed status.

6. The computer implemented method of claim 2 further comprising:
   responsive to a response of the submitter to the action resolution indicating rejection, changing the status of the action item to a rejected status;
   sending a rejected action resolution back to the owner for rework; and
   changing the status of the action item with the rejected action resolution to the pending submitter sign-off status after the owner submits a new action resolution.

7. The computer implemented method of claim 1, further comprising:
   receiving a query through the client application;
   sending the query to a search engine; and
   generating a list of one or more of a plurality of lessons learned in response to the query, wherein the list of one or more of the plurality of lessons learned is a ranked list of lessons learned, and wherein the ranked list of lessons learned is ranked according to predefined ranking criteria and ranking values associated with a ranking component;
   receiving a selection of lessons learned from the ranked list of lessons learned; and
   receiving an owner assignment for each of the lessons learned in the selection of lessons learned.

8. The computer implemented method of claim 1, further comprising:
   receiving a request for a comparison report; and
   adjusting a selection criteria for a future list of lessons learned in response to the comparison report.

9. A computer program product comprising:
   a computer usable storage medium storing computer usable program code for receiving a lesson learned associated with a project through a client application, wherein the lesson learned comprises information describing a task associated with a project, the computer usable storage medium comprising:
   computer usable program code for identifying a rating value for the lesson learned received from the client application, wherein the rating value is determined combining a plurality of criteria in a predefined level matrix, wherein the predefined level matrix contains the rating value for each combination of the plurality of criteria;
   computer usable program code for generating a workflow notification process to address the lesson learned, wherein the workflow notification process is executed by a notification manager; and computer usable program code for monitoring the lesson learned for a duration of the project;
   wherein the plurality of criteria comprise a complexity to implement the lesson learned criteria and a positive impact of implementing the lesson learned criteria, wherein the each of the plurality of criteria is further comprised of one or more levels, and wherein each of the one or more levels corresponds to the rating value.

10. The computer program product of claim 9, further comprising:
    computer usable program code for creating an action item associated with the lesson learned, wherein the action item comprises at least a target date for completion, an owner assignment, and a manager of the owner assignment, and wherein the target date for completion, the owner assignment, and the manager of the owner assignment is received from a submitter;
computer usable program code for sending the action item to an owner;
computer usable program code for receiving an action resolution from the owner in response to sending the action item;
computer usable program code for forwarding the action resolution to the submitter;
computer usable program code for receiving the submitter response to the action resolution; and
computer usable program code for changing the status of the action item accordingly.

11. The computer program product of claim 10, wherein the owner accepts or rejects the action item as being assigned to the correct owner.

12. The computer program product of claim 10, further comprising:
computer usable program code for changing the status of the action item to an open status when the action item is created; and
computer usable program code for changing the status of the action item to an in progress status upon receiving a notification by a lessons learned coordinator, wherein the notification by the lessons learned coordinator occurs once a meeting has been held and the owner has committed to the action item.

13. The computer program product of claim 10, further comprising:
computer usable program code for, responsive to a submission of the action resolution by the owner, changing the status of the action item to a pending submitter sign-off status; and
computer usable program code for, responsive to a response of the submitter to the action resolution indicating acceptance, changing the status of the action item to a closed status.

14. The computer program product of claim 10, further comprising:
computer usable program code for, responsive to a response of the submitter to the action resolution indicating rejection, changing the status of the action item to a rejected status;
computer usable program code for sending a rejected action resolution back to the owner for rework; and
computer usable program code for changing the status of the action item with the rejected action resolution to the pending submitter sign-off status after the owner submits a new action resolution.

15. The computer program product of claim 9, further comprising:
computer usable program code for receiving a query through the client application;
computer usable program code for sending the query to a search engine; and
computer usable program code for generating a list of one or more of a plurality of lessons learned in response to the query, wherein the list of one or more of the plurality of lessons learned is a ranked list of lessons learned, and wherein the ranked list of lessons learned is ranked according to predefined ranking criteria and ranking values associated with a ranking component;
computer usable program code for receiving a selection of lessons learned from the ranked list of lessons learned; and
computer usable program code for receiving an owner assignment for each of the lessons learned in the selection of lessons learned.

16. The computer program product of claim 9, further comprising:
computer usable program code for receiving a request for a comparison report; and
computer usable program code for adjusting a selection criteria for a future list of lessons learned in response to the comparison report.

17. A data processing system for managing lessons learned, the data processing system comprising:
a client application, wherein the client application receives a lesson learned associated with a project, and wherein the lesson learned comprises information describing a task associated with a project;
a predefined level matrix, wherein the predefined level matrix identifies a rating value for the lesson learned received from the client application, wherein the rating value is determined by combining a plurality of criteria in a predefined level matrix, wherein the predefined level matrix contains the rating value for each combination of the plurality of criteria; and
a notification manager executed by a processor, wherein the notification manager generates a workflow notification process to address the lesson learned;
wherein the plurality of criteria comprise a complexity to implement the lesson learned criteria and a positive impact of implementing the lesson learned criteria, wherein the each of the plurality of criteria is further comprised of one or more levels, and wherein each of the one or more levels corresponds to the rating value.

18. The data processing system of claim 17, further comprising:
a search engine, wherein the search engine receives a query from the client application, and wherein the search engine generates a list of one or more of a plurality of lessons learned in response to the query, and wherein the list of one or more of the plurality of lessons learned is a ranked list of lessons learned.

* * * * *